Nov. 8, 1932.  S. B. ATWOOD  1,886,934
DOOR BUMPER
Filed Aug. 4, 1931
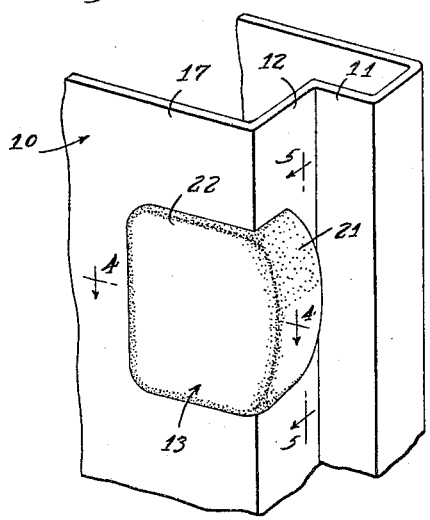
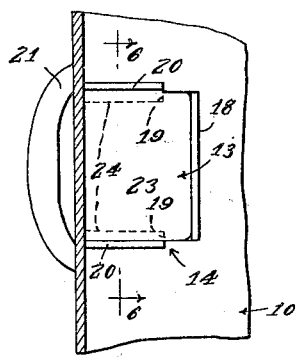
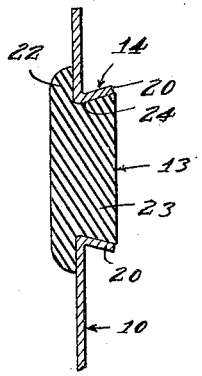
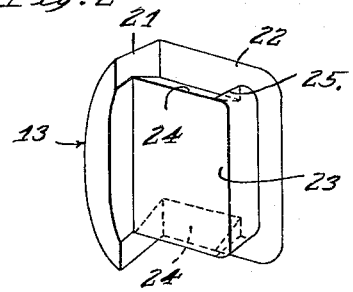
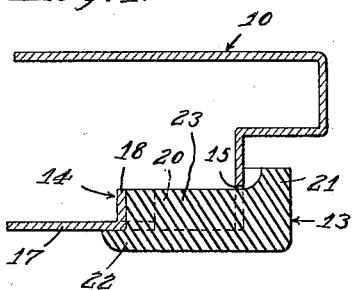
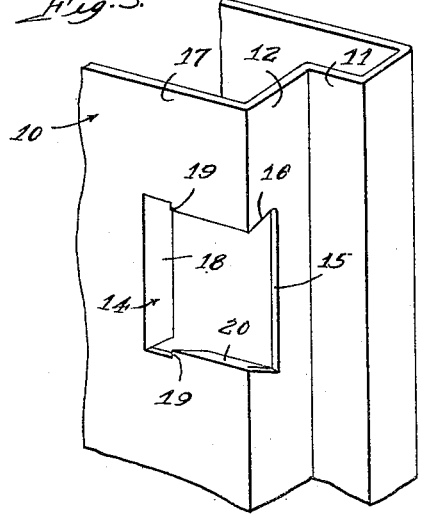
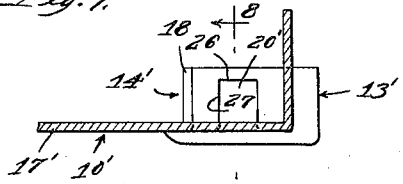
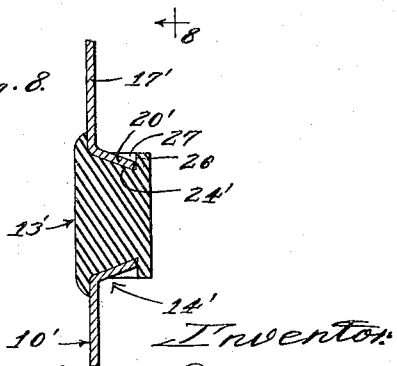
Inventor
Seth B. Atwood
By Wilson, Bowell, McCanna & Rehm
Attys.

Patented Nov. 8, 1932

1,886,934

UNITED STATES PATENT OFFICE

SETH B. ATWOOD, OF ROCKFORD, ILLINOIS

DOOR BUMPER

Application filed August 4, 1931. Serial No. 555,106.

This invention relates to bumpers for automobile doors, for cushioning the closing of the doors, as well as preventing rattling thereof in closed position.

When automobile body frames were of wooden construction, bumpers could be fastened in place thereon satisfactorily by means of a stamped sheet metal retainer fastened in a socket cut therefor in the frame, as illustrated in Atwood Patents #1,523,627 and #1,535,446. The change to steel frame construction, or steel covered frame construction brought with it the problem as to how to fasten the bumpers satisfactorily under these conditions. It is, therefore, the principal object of my invention to provide a bumper of resilient material, generally similar to those used heretofore, but having the retainer therefor formed directly in the steel frame.

In the mounting of a bumper in a hole provided therefor in a steel pillar, it is a problem to provide ample support for the bumper to withstand compression. It is accordingly another object of my invention to form the retainer in the pillar in such a way that a wall is provided to back up the bumper and provide the proper support therefor.

Another object is to provide inwardly bent lugs on the pillar and recesses in the bumper to receive the same, whereby to grip the bumper and prevent accidental disengagement thereof from its hole in the pillar.

The invention is illustrated in the accompanying drawing, in which—

Figure 1 is a perspective view showing a door jamb on a steel pillar equipped with a bumper made in accordance with my invention;

Fig. 2 is a perspective view of the bumper removed, looking at it from the back;

Fig. 3 is a view corresponding to Figure 1, but showing the bumper removed so as to disclose the retainer formed in the pillar;

Fig. 4 is a horizontal section on the line 4—4 of Figure 1;

Fig. 5 is a vertical section on the line 5—5 of Figure 1 looking at the back of the bumper;

Fig. 6 is a cross-section on the line 6—6 of Fig. 5;

Fig. 7 is a horizontal section through the pillar, but showing a modified form of retainer and bumper, the bumper and retainer appearing in plan, and Fig. 8 is a vertical section on the line 8—8 of Fig. 7.

Similar reference numerals are applied to corresponding parts throughout the views.

I have illustrated the invention as applied to an automobile frame of steel construction, but it will soon appear that the invention is equally adapted to frames of combined steel and wood construction. The steel pillar shown at 10 is rabbetted, as indicated at 11, to provide the door jamb or impact ledge 12 offset inwardly from the plane of the outside of the body for the reception of the complementarily formed edge of the door arranged to strike the bumper, indicated generally by the reference numeral 13. The socket or retainer for the bumper is, in accordance with my invention, formed directly in the frame, as indicated at 14, thus making the same adaptable with equal facility to frames of steel construction or steel and wood construction, as should be evident. In a frame of wood and steel construction, the wood is, of course, simply routed out to make room for the retainers and the bumpers to be received therein, as will soon appear.

The pillar 10 has the bumper receiving socket or retainer 14 formed therein by cutting an opening 15 in the jamb, the top and bottom of which converge, as indicated at 16, toward the side wall or flange 17 of the pillar, this undercutting being taken advantage of, as will soon appear, in the holding of the bumper in the retainer. The side wall 17 of the pillar has a lug 18 bent inwardly substantially at right angles to the plane of the side wall to form a substantially vertical back wall for the retainer on which the bumper is arranged to seat. Shoulders 19 are defined in forwardly spaced relation to said back wall at the top and bottom of the retainer behind lugs 20 bent inwardly from the side wall 17 directly behind the front wall defining the door jamb 12. The lugs 20, as best appears in Figs. 5 and 6, are disposed in outwardly convergent relation to one another. Now, the bumper 13 is of molded rubber or other suitable resilient material in the form of a generally L-shaped body providing a narrow front flange 21 for abutment by the door and a wider side flange 22 to fit against the side wall 17 of the pillar. An elongated boss 23, rectangular in cross-section, is provided on the back of the side flange 22 reaching rearwardly from the front flange 21, and has recesses 24 provided in the top and bottom thereof in which the lugs 20 are arranged to be entered to hold the bumper against lateral displacement from the retainer. The shoulders 25 define the rear ends of these recesses and are arranged by cooperation with the shoulders 19 in the retainer to hold the bumper against forward displacement. In the installation of the bumper, either end is first entered into the retainer and the bumper is then compressed endwise until it is possible to force the other end into the retainer, whereupon the bumper immediately expands and is securely anchored in place.

It should be apparent from the foregoing description that I have provided a bumper of simple and economical construction and one which is thoroughly practical and will give good service, owing to the fact that it is properly backed up in the retainer for compression and is securely anchored in place so that it cannot possibly come out.

In Figs. 7 and 8 I have illustrated a slightly modified form of socket or retainer 14' for a bumper 13' of slightly modified construction. In this case the steel pillar 10' has the side wall 17' struck to provide the lug 18 to form the back wall of the retainer, as in the previous form, but instead of having outwardly convergent lugs like the lugs 20, lugs 20' are provided which are inwardly convergent, as clearly appears in Fig. 8, and recesses 24' are provided in the bumper of complementary form to receive the same, thus providing shoulders 26 defining the inner walls of these recesses, which by cooperation with the inner ends of the lugs, serve to prevent lateral displacement of the bumper from the retainer. The lugs also prevent forward displacement of the bumper from the retainer by cooperation with the rear walls 27 of the recesses. In this construction, as in the other, the retainer provides good backing for the bumper to withstand compression thereof, and it is, of course, apparent that the bumper can be inserted by first entering one end thereof in the retainer and then compressing the bumper endwise until the other end can be inserted.

I claim:

1. In a device of the class described, a steel pillar providing a door jamb thereon, the pillar having a bumper receiving socket provided directly therein opening from the door jamb and the adjoining side wall of the pillar, the side wall of said pillar being formed to provide an inwardly projecting back wall for the socket and inwardly projecting lugs at the top and bottom of the socket.

2. A structure as set forth in claim 1 wherein the retaining lugs are provided in forwardly spaced relation to the back wall for the purpose described.

3. A structure as set forth in claim 1 wherein the side wall has shoulders thereon defined directly behind the retaining lugs and in forwardly spaced relation to the back wall for the purpose described.

4. In a device of the class described, a steel pillar providing a door jamb thereon, the pillar having a bumper receiving socket provided directly therein opening from the door jamb and the adjoining side wall of the pillar, the side wall of said pillar being formed to provide inwardly projecting lugs at the top and bottom of the socket, said lugs being bent into converging relation for the purpose described.

5. In a device of the class described, a steel pillar providing a door jamb thereon, the pillar having a bumper receiving socket provided directly therein opening from the door jamb and the adjoining side wall of the pillar, the side wall of said pillar being formed to provide an inwardly projecting back wall for the socket and inwardly projecting lugs at the top and bottom of the socket, said lugs being bent into outwardly converging relation for the purpose described.

6. A door bumper device comprising a metal door pillar cut and bent to provide an impact ledge, a flange extending inwardly therefrom, the pillar being provided with an opening starting near the edge of said impact ledge and extending to said edge and inwardly in the flange and a bumper seat on said flange inside the pillar at the inner end of said opening, the aforesaid opening being adapted to receive a resilient bumper block disposed in engagement with said seat, and lugs projecting from cut edges of said pillar to retain said bumper block in the opening in position on said seat and projecting from said impact ledge.

7. A door bumper device comprising a metal door pillar cut and bent to provide an impact ledge, a flange extending inwardly therefrom, the pillar being provided with an opening starting near the edge of said impact ledge and extending to said edge and inwardly in the flange, and a vertical bumper seat on said flange disposed inside the pillar at the inner end of said opening and substantially at right angles to the plane of said flange, the aforesaid opening being adapted to receive a resilient bumper block disposed in engagement with said seat, and lugs projecting from cut edges on the flange inwardly into the pillar, serving to retain said bumper block in the opening in position on said seat and projecting from the impact ledge.

8. A door bumper device comprising a metal door pillar cut and bent to provide an impact ledge, a flange extending inwardly therefrom, the pillar being provided with an opening in the pillar starting near the edge of said impact ledge and extending to said edge and inwardly in the flange, the aforesaid opening being adapted to receive a resilient bumper block, and lugs projecting from cut edges of said pillar inwardly into the pillar to retain the bumper block in the opening and projecting from the impact ledge.

9. A door bumper device comprising a metal door pillar cut and bent to provide an impact ledge, a flange extending inwardly therefrom, the pillar being provided with an opening in the pillar starting near the edge and inwardly in the flange, the aforesaid opening being adapted to receive a resilient bumper block, and lugs formed on the pillar in said opening serving to retain the bumper block in the opening and projecting from the impact ledge.

In witness of the foregoing I affix my signature.

SETH B. ATWOOD.